May 7, 1957     C. F. BAREFORD ET AL     2,791,695
ELECTRICAL COUNTING APPARATUS
Filed March 6, 1952     6 Sheets-Sheet 1

INVENTORS
CHRISTOPHER FREDERIC BAREFORD.
HUGH ALEXANDER BELL.
By
Agent

Fig. 4

PARTICLE

A.1. ———————————⎍———————— (b)

A.2. ———————————⎕———————— (d)

S.G.2 ——————————⎕———————— (f)

NO PARTICLE.

INVENTORS
Hugh Alexander Dell
Christopher Frederic Bareford
By
Agent

Fig. 6

INVENTORS
Hugh Alexander Dell
Christopher Frederic Bareford
By

Agent

United States Patent Office 2,791,695
Patented May 7, 1957

2,791,695
ELECTRICAL COUNTING APPARATUS

Christopher Frederic Bareford, Reigate, and Hugh Alexander Dell, Horley, England, assignors, by mesne assignments, to North American Philips Company, Inc., New York, N. Y., a corporation of Delaware Application March 6, 1952, Serial No. 275,184

Claims priority, application Great Britain March 6, 1951

9 Claims. (Cl. 250—49.5)

This invention relates to apparatus for counting particles and is particularly but not exclusively concerned with the assessment of the dust content of an air sample.

In many industries, the process carried on gives rise to contamination of the air by particles of matter, for example, in coal mines the introduction of mechanical cutting and conveying equipment has tended to increase the amount of coal and stone dust in suspension in the air. As is well known, such contaminated air is harmful to human beings and the choice and design of suitable dust separating or removing apparatus has to be governed by the range of size and concentration of the dust particles in the air.

In other industrial processes which have to be carried on in as nearly dust-free conditions as practicable, for example, photographic coating processes, plastic film-making processes and the like, it is a great advantage to know the degree of contamination of the air or other ambient atmosphere and the relative sizes and proportions of the dust particles.

Other industries are concerned with the manufacture of finely divided materials, for example, flour and face powders, and in those cases also the apparatus of the present invention may be employed to give an accurate assessment of the relative sizes of the particles in a representative sample at any stage in the manufacture of the products.

Hitherto assessment of the contamination of air or other gas by dust has been effected by preparing a sample taken under controlled conditions, such sample being for example a transparent plate on which the dust particles have settled and been fixed on an enlarged photograph of such plate, visually examining the sample under a microscope and counting the particles in a representative area. This is a long and laborious task and the results obtained by different observers from the same sample may show wide variations. This is particularly the case when the particles vary greatly in size.

The object of the invention is to improve the accuracy and speed of counting by replacing visual counting by automatic electrical counting apparatus.

A further object is to provide electrical counting means which is responsive to and distinguishes between particles of different sizes.

With these and other objects in view and according to the invention, particle counting apparatus comprises means such as a cathode ray tube for scanning a sample of the particles to be counted, means such as a photoelectric cell co-operating with the scanning means for producing an electrical signal which is a measure of the presence and distribution of the particles, means for avoiding multiple counting of a large particle scanned more than once and counting means responsive to the derived signal or signals for giving an indication of the total number of particles scanned.

When the sample is in the form of a transparent plate bearing the particles or a photographic representation of the same on an enlarged scale, the scanning means may comprise a cathode ray tube, the beam or "flying spot" of which is caused, by suitable saw-tooth time bases to trace out a raster of rectangular form and of such size as to illuminate the plate or such part of it as it is required to examine. By suitable optical means the light from the cathode ray tube face passing through the sample is caused to fall on a pick-up device such as a photo-cell so that the output of the pick-up device in time is an electrical representation of the presence or absence of particles in the scanning lines.

Since the particles may vary in size it is possible that a large particle may overlap two or more lines of scan and according to a further feature of the invention position memory devices are provided to ensure that the presence of such large particles is detected and that each is only counted once. In accordance with yet another feature of the invention means are provided for separately counting particles of different sizes, the grading of a particle being dependent on the number of scanning lines it overlaps. Such grading may be arbitrarily selected, for example, in certain cases two grades only may suffice but in others where the particle sizes vary widely, it may be desirable to have, say five grades.

Other features of the invention will be apparent from the following description which is given by way of example only and with reference to the accompanying drawings in which.

Figures 1, 1A, 1B:
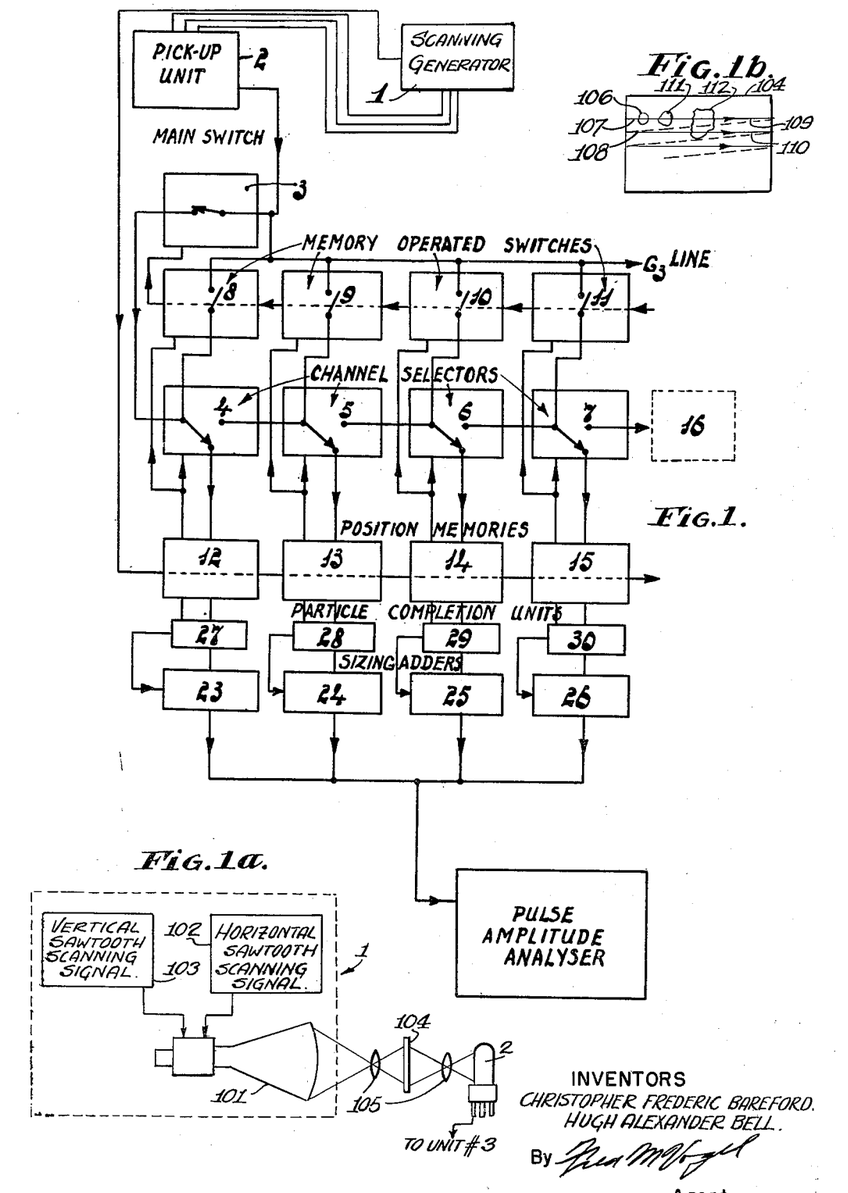
Figure 1 is a block schematic diagram of a particle counting apparatus according to the invention.
Figures 1a and 1b show details of the apparatus of Figure 1, Figures 2, 3, and 4 show a circuit diagram of one complete channel.

Referring now to the diagrams of Figures 1, 1a and 1b, the unit 1 designated "scanning generator" comprises a cathode ray tube 101 with sawtooth "line" and "frame" time bases 102 and 103 to cause the electron beam to produce a rectangular raster on the tube face. It will be understood that when the device is operating, it is only necessary for one complete raster to be produced for one complete scan of the sample. Associated with the cathode ray tube is a pick-up device such as a photo-cell shown as unit 2 in Figure 1. A sample 104 of the particles to be counted is interposed between the cathode ray tube 101 and the photo-cell 2 so that as the sample is scanned, the photo-cell provides an electrical signal which is a representation of the presence or absence of particles in the scanning lines. Suitable lenses 105 are provided, so that the "flying spot" of light on the face of the cathode-ray tube 101 will be directed onto the sample 104; and, depending on the density of various portions of the sample, varying amounts of light will pass through the sample and be directed to the pick-up unit 2 and cause an electric signal to be generated therein. The scanning spot of light on the sample 104 is indicated at 106 in Figure 1b, and moves to form scanning lines 107, 108, etc., and retrace paths 109, 110, etc., which are projections of the flying spot pattern on the face of the cathode-ray tube 101.

The sample may be a transparent plate having the dust particles adhering to it or it may be a photographic reproduction in the form of a lantern slide of an actual sample to the same or different scale. Alternatively, the sample may be, for example, in the form of a photographic print from which light is reflected into the pick-up device and may be either a positive or negative image, that is to say, the dust may appear as black marks on a white ground or as white marks on a black ground.

When the scanning of the first line 107 commences the first particle 111 in that line, which will be assumed to be a small one not overlapping the second line 108, causes the pick-up device to pass a pulse through a main control switch 3 to a channel selector 4 by which it is directed into an associated position memory unit 12. The pulse is also fed to the memory operated switches 8, 9, 10, 11 but these are "open." The position memory unit 12 is triggered by the pulse and a return connection from this unit to the channel selector switch 4 causes this to operate to connect the main control switch 3 via 4 to channel selector 5. When the next pulse in the first line arrives, and it will be assumed that this corresponds to the first scanning of a large particle 112 overlapping the second line, it triggers the position memory unit 13 which in turn operates its associated channel selector switch 5 so that the next succeeding pulse is passed to the input of channel selector switch 6. Further particles in the first scanning line trigger the succeeding memory units 14, 15 etc. with their associated channel selectors 6, 7 etc. In order to take care of an unexpectedly greater number of particles in one line the last channel selector may switch the output from the pick-up unit to an "overs" counter 16 which registers the extra particles but does not discriminate between particles of different sizes.

The basis for each position memory unit, which will be more fully described in the convenient embodiment hereafter, comprises a capacitor to which is applied the line scanning potential of saw-tooth waveform. The position on a scanning line of the scanning beam in the cathode-ray tube, at any given instant, corresponds to the instantaneous voltage of the saw-tooth waveform. Thus, the charge on the capacitor at any given moment represents a definite position along the line of scan. When a pulse is received by the memory unit, the charging of the capacitor is terminated. By causing the capacitor to hold such a charge acquired from the scanning of a particle in one line until a corresponding position is reached in the next line it can be determined whether the particle extends over more than one line or not. If it does, the capacitor again maintains a charge which it holds until the succeeding line is scanned. This multiple scanning of a large particle can be utilized as described hereafter to actuate means indicating not only the number of such particles but their relative sizes.

If it be assumed that after the completion of the first scanning line all the channel selectors have been energised, then all the memory units associated with them will also be carrying charges representing the positions of particles in that line.

Now it will be assumed that the first particle in the second line to be scanned is not encountered until after the scanning beam has traversed a distance corresponding to the distance in the first line which includes the first two particles.

As the scanning of the second line proceeds, and just before the scanning beam reaches the position along the line corresponding to the position of the first particle in the first line the first position memory unit 12 is actuated as hereinafter described and this causes the associated channel selector switch 4 to be operated and the main control switch 3 to be opened. At the same time, the memory operated switch 8 is closed. This ensures that the output (if any) from the pick-up unit 2 flows only into the first channel.

In the case under review the first particle in the first line is a small one so that in the corresponding position in the second line no pulse is received from the pick-up unit 2. After a predetermined time interval, which may be termed the "inspection period" the memory operated switch 8 opens and the main control switch 3 closes and the channel selector switch 4 is left in the position shown in Figure 1. Thus the first channel is now free for any new particle encountered in the second line.

When the scanning beam reaches a position in the second line just short of the corresponding position of the second (large) particle in the first line, position memory unit 13 operates and channel selector switch 5 is lowered to the position shown in Figure 1. At the same time, the main control switch 3 is opened and the memory operated switch 9 is closed so that when the expected pulse (corresponding to the large particle) arrives it proceeds to the memory unit 13 which is reset so that a further similar check can be made in the third line. at the end of the inspection period the main control switch 3 reverts to its closed position and the memory operated switch 9 opens. If now a new particle is encountered in the second line a pulse from the pick-up unit 2 will be routed through control switch 3 to channel selector switch 4 which passes it to the memory unit 12. If a second new particle in the second line is encountered it will be passed by the channel selector switches from one to the other until an open channel is discovered. If none is available then the signal is fed to the "overs" counter 16.

It will be clear from the foregoing that if any position memory is "occupied" then in spite of the fact that a preceding channel selector switch may be in a position in which the main route from the pick-up unit 2 is open the operation of the appropriate memory operated switch and the main control switch 3 will enable the expected pulse to pass into the position memory and reset it.

It will also be clear that the channels themselves do not permanently correspond to the position of particles since any channel which becomes vacant can be used by the next new pulse received from the pick-up unit 2.

Practical embodiments given by way of example only of the various units will now be described under their appropriate headings.

It will be most convenient to start with the channel selector switch since the operation of the preceding main control and memory-operated switches will be more readily understood after the operation of the channel selector switch has been described.

*Channel selector switch*

Figure 2:
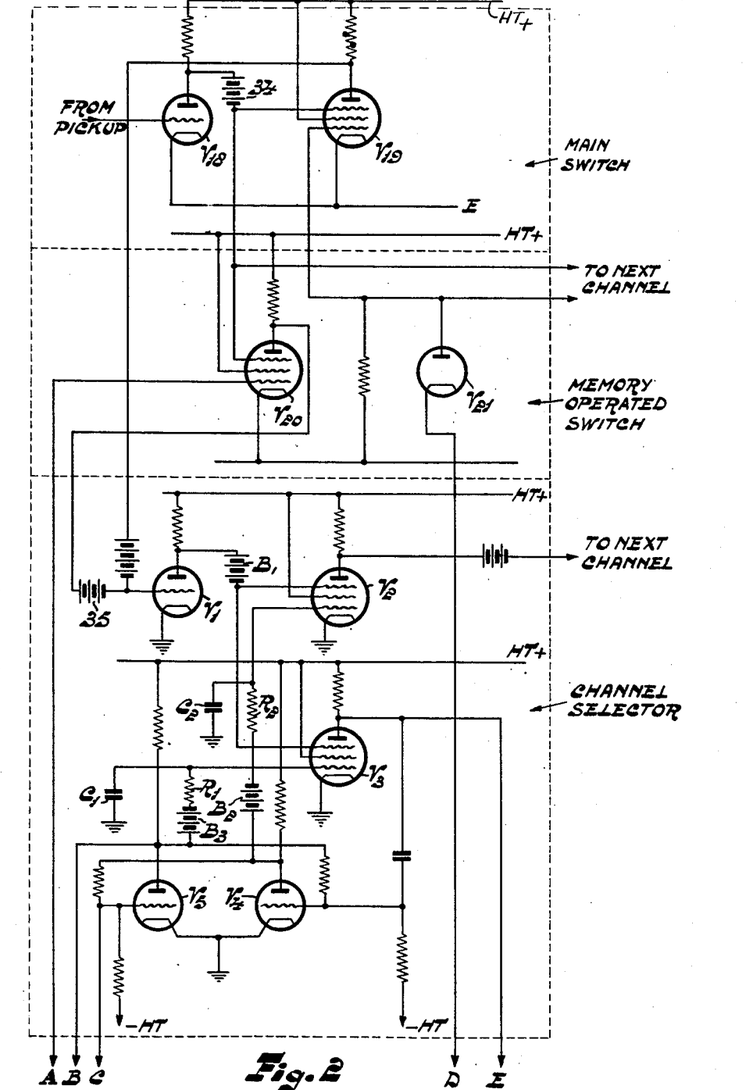

A single channel selector switch is shown in Figure 2.

It comprises an input valve $V_1$, to the control grid of which the signals from the pick-up 2 are supplied via the main switch 3, the valve acting as a buffer and polarity invertor.

The anode of $V_1$ is connected to the suppressor grids of valves $V_2$ and $V_3$, these grids being maintained in the normal or starting condition, as indicated diagrammatically by interposition of battery $B_1$, at a potential relative to their respective cathodes which just prohibits the flow of anode current.

A further pair of valves $V_4$ and $V_5$ constituting a bistable multi-vibrator is provided, the anode of valve $V_4$ being connected, with the interposition of biassing battery $B_2$, to the control grid of $V_2$ and the anode of $V_5$ through battery $B_3$ to the control grid of $V_3$.

In the initial or starting condition the valve $V_2$ is cut-off, that is, no anode current flows due to the fact that its control and suppressor grids are at a low potential, but valve $V_3$ is in the suppressed condition, that is, the valve is open on its control grid but cut-off on its suppressor grid so that no anode current flows, the emission current going to the screen grid.

When a negative pulse is received on the control grid of valve $V_1$, no signal appears at the anode of the valve $V_2$ as although it is opened on its suppressor grid it remains cut-off because of its low control grid voltage but a negative signal appears at the anode of $V_3$ since this valve is opened from its suppressed condition. This negative signal is fed to (a) the corresponding sizing adder to be later described, (b) the particle completion unit, also to be described later, and (c) to the bi-stable multivibrator $V_4$, $V_5$.

The valve $V_4$ is, in the initial or starting condition, conducting, so that a negative signal (from $V_3$) applied to its control grid causes it to trip so that $V_5$ conducts and $V_4$ is cut off. Via suitable delay networks $R_1$, $C_1$ and $R_2$, $C_2$ the control grid of $V_3$ is lowered in potential and that of $V_2$ raised. Valve $V_3$ is then cut off and $V_2$ is suppressed. Later signals from $V_1$ are thus fed to the anode of $V_2$ and so out to the next similar channel selector switch unit. During such later signals no signals appear at the anode of $V_3$.

Position memory unit

Figure 6:
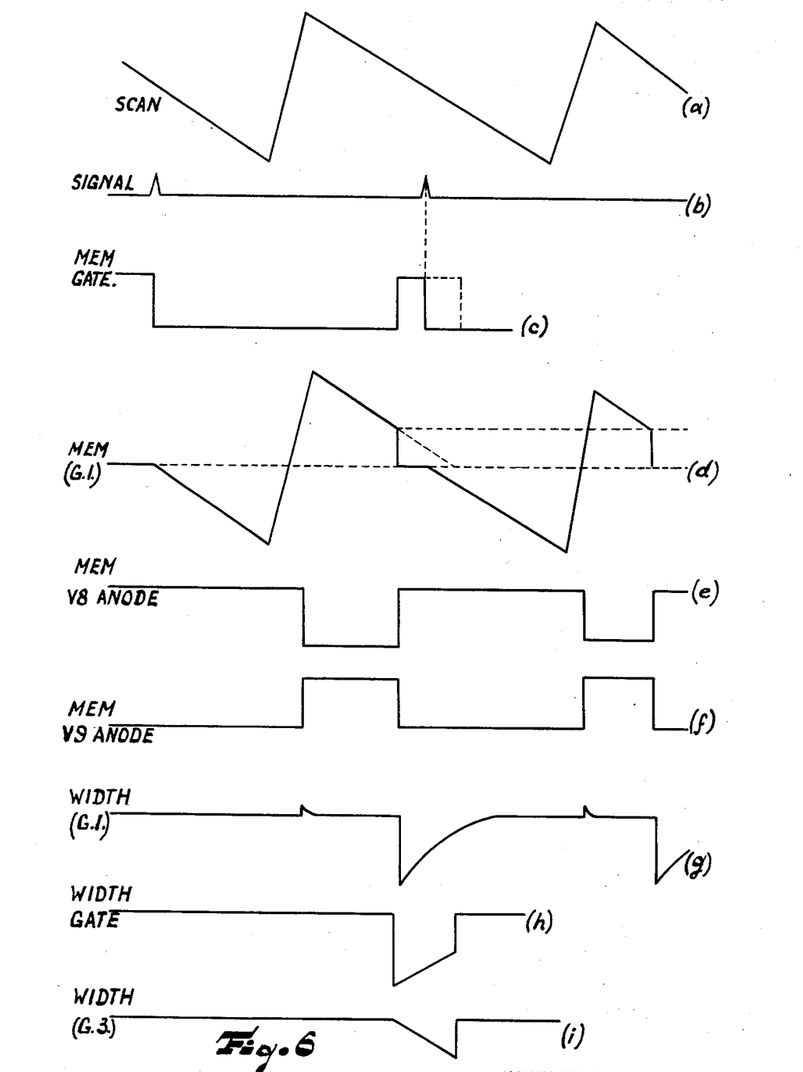

The "memory" capacitor CM (Figure 3) has one of its poles connected to the line scanning potential of negative-going saw-tooth waveform (see Figure 6(a)). Its other pole is connected to the junction 18 of the cathode of valve $V_6$ with the anode of valve $V_7$. The control grid of valve $V_7$ is suitably biassed with respect to the control grid of valve $V_6$, as indicated diagrammatically by battery 17 and the latter grid is connected to the anode of valve $V_5$ (Figure 2, connecting link B). The junction 18 is connected to the grid of valve $V_8$ which, with valve $V_9$, forms a cathode coupled bi-stable multivibrator. The anode of valve $V_8$ is connected through resistor 19 to the control grid of valve $V_9$ and this control grid is suitably biassed from potential divider 20 through resistor 21.

Figure 3:
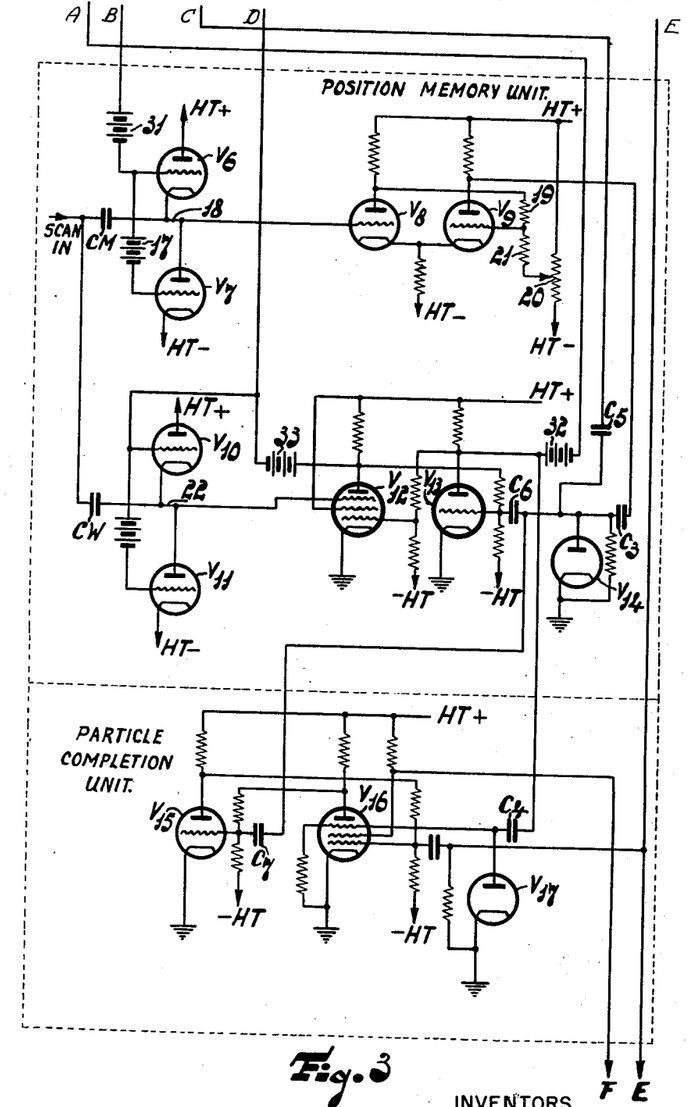

In the initial or starting condition the valves $V_6$ and $V_7$ form a clamp maintaining the junction 18 at or about zero potential. The valve $V_8$ is initially cut off.

When a pulse (indicated diagrammatically in Figure 6(b)) is received by valve $V_1$ (Figure 1) the flip-flop pair $V_4$, $V_5$ trips and the anode voltage of $V_5$ falls. This drop of potential (Figure 6(c)) is communicated (through link B and biassing battery 31) to the grids of valves $V_6$, $V_7$ and the clamp is opened.

The pole of the capacitor CM, connected to the junction 18 is then no longer maintained at a steady potential and the capacitor maintains its instantaneous charge. Thereafter this pole of the capacitor follows the descending saw-tooth potential (see Figure 6(d)) until on the flyback (at the end of the scanning line) it rises above earth potential and causes $V_8$ to conduct (see Figure 6(e)). Such conduction causes a drop in the anode potential of $V_8$ which is communicated to the control grid of valve $V_9$ causing $V_9$ to be cut off. This results in a rise of potential at the anode of $V_9$ (see Figure 6(f)) and the bi-stable multivibrator $V_8$, $V_9$ has "flopped" to its other condition of operation. As the sawtooth potential falls in the subsequent scanning line a moment is reached when, if the potentiometer 20 is correctly adjusted the valve $V_8$ ceases to conduct and the valve $V_9$ again conducts (see Figure 6(d), (e) and (f)).

At this moment, the derived input signal (from valve $V_5$ through link B) should be terminated so that the clamp is closed (i. e. $V_6$ and $V_7$ again conduct) and this may conveniently be done by utilising the change of potential at the anode of $V_9$ as is described below. This ensures that should a new pulse be received the memory unit is in a receptive condition.

Adjustment of the potentiometer 20 can be effected so as to cause the multivibrator $V_8$, $V_9$ to "flop" just before the potential on the grid of $V_8$ returns to the potential it had at the moment the first pulse was received (i. e. substantially zero potential) thus providing an "anticipation" interval before the receipt of the expected pulse.

The anode of $V_9$ is coupled via capacitor $C_3$ to the anode of diode $V_{14}$. During the flyback $V_9$ is cut off by the potential on its grid so that the anode voltage rises. However, diode $V_{14}$ prevents this from doing more than charging $C_3$ since the diode conducts (see Figure 6(g)).

When the descending saw-tooth potential reaches a value at which the "anticipation control" resets the cathode coupled multivibrator $V_8$, $V_9$, the valve $V_9$ conducts once again, the anode voltage falls and a negative pulse appears on the anode of diode $V_{14}$ (Figure 6(g)).

This negative pulse is fed to three units: (a) it resets the channel switch (to the position shown in Figure 1) by altering the potential of the control grid of valve $V_5$ through link C and capacitor $C_5$. Thus $V_3$ reverts to the conducting state while $V_2$ is cut off. As a consequence the input signal to the clamp $V_6$, $V_7$ rises in potential and the clamp shuts, (b) its sets the "width" unit (about to be described) which determines the period of time during which a particle is to be expected, and (c) its sets the particle completion unit which is to indicate whether a particle has been totally counted or not.

The "width" unit comprises valves $V_{10}$ and $V_{11}$ forming a further clamp and valves $V_{12}$ and $V_{13}$ forming a multivibrator. The valve $V_{13}$ is initially conducting and the valve $V_{12}$ cut off. The valves $V_{10}$ and $V_{11}$ are initially conducting so that lead 22 joining the cathode of $V_{10}$ to the anode of $V_{11}$ and to one pole of "width" capacitor CW is initially maintained at or about zero potential. The other pole of capacitor CW is connected to the output of the saw-tooth scanning generator 1.

When the negative pulse appears at the anode of $V_{14}$ it is communicated to the control grid of $V_{13}$ through capacitor $C_6$ and cuts off the conduction of this valve. The anode potential rises and this rise of potential is communicated through link A and battery 32 to the associated memory operated switch (to be later described) and to the control grid of valve $V_{12}$. This causes valve $V_{12}$ to conduct with a consequent drop in its anode potential which is communicated through biassing battery 33 to the control grids of valves $V_{10}$ and $V_{11}$ thus opening the clamp by cutting off these valves. The saw-tooth potential now appearing on lead 22 also appears on the suppressor grid of valve $V_{12}$, which, when the negative-going saw-tooth has descended by a predetermined potential drop, again suppresses valve $V_{12}$ (see Figure 8(j)). This potential drop represents the time the "width" unit is open to receive the expected pulse representing the second appearance of a large particle.

The negative pulse appearing at the anode of $V_{12}$ consequent upon the receipt of the negative pulse at the anode of valve $V_{14}$ is also communicated through link D to the associated memory-operated switch for a purpose to be later described.

Particle completion unit

This unit comprises valves $V_{15}$ and $V_{16}$ which form a multivibrator or flip-flop of which valve $V_{15}$ is initially conducting and $V_{16}$ is cut off due to the standing potentials on its control and suppressor grids.

Figure 5:
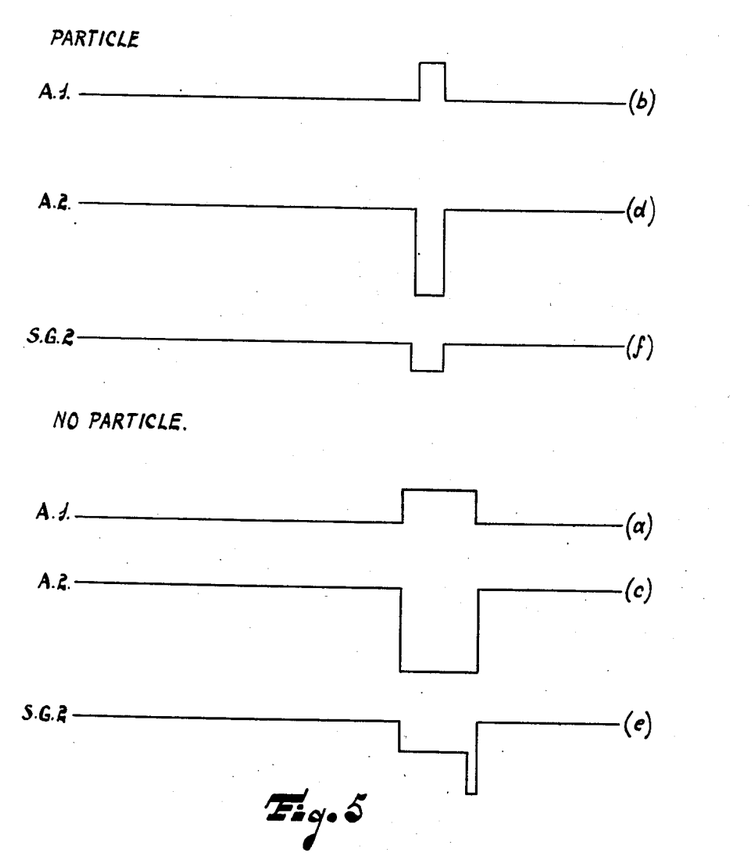
Figure 5 shows the wave forms appearing in the particle completion unit and Figure 6 shows other wave forms appearing at various places in the units.

The negative pulse appearing at the anode of valve $V_{14}$ (when the memory is "opened" to receive a signal corresponding to the repetition of a pulse representing a large particle) is communicated to the control grid of valve $V_{15}$ through capacitor $C_7$ to cut it off thus causing the anode potential to rise (see Figure 5(a) or (b)). This rise of potential appears on the control grid of valve $V_{16}$ and causes it to conduct (see Figure 5(c) or (d)). The potential of the screen grid therefore falls and remains at the lower value until the valve $V_{16}$ is cut off again either at the end of the "width" period or by the receipt of the pulse representing the large particle. In the former case, at the end of the "width" period, if no pulse has been received, the anode of valve $V_{13}$ drops to potential and this fall is communicated through capacitor $C_4$ to the anode of diode $V_{17}$ which does not conduct so that the fall of potential appears on the suppressor grid of valve $V_{16}$ and cuts off the flow of current to the anode. The screen grid now carries the valve emission current and the potential of the screen grid falls (Figure 5(e)). This potential rises again when the rise of potential at the anode of $V_{16}$ causes the valve $V_{15}$ to conduct again which in turn causes the valve $V_{16}$ to be cut off on its control grid.

In the alternative case when a particle pulse is received during the "width" period a negative pulse is received from the anode of valve $V_3$ (Figure 2) and this is communicated directly to the control grid of valve $V_{16}$ through link E. This causes the valve $V_{16}$ to be cut off on its control grid before the end of the width period and the screen grid potential does not fall as in the former case (see Figure 5(f)). This difference in the screen grid potential, depending on whether a particle pulse is received or not during the "width" period, is utilised to actuate the associated sizing adder and an amplitude analyser as hereafter explained.

Main control switch

The function of this switch has been described above and it comprises, in one convenient form, a pair of valves $V_{18}$ and $V_{19}$ (Figure 2) of which valve $V_{18}$ is initially conducting. When a negative pulse is received on the control grid of this valve from the pick-up unit 2, the valve ceases to conduct and its anode voltage rises. This rise of potential is communicated (through biassing battery 34) to the suppressor grid of pentode valve $V_{19}$ which permits current to flow to the anode of this valve resulting in a negative pulse being passed to valve $V_1$ of the first channel selector switch 4 (Figure 1). The positive pulse appearing at the anode of valve $V_{18}$ is also communicated to all the memory-operated switches about to be described. The control grid of valve $V_{19}$ is also connected to all the memory-operated switches as described below.

Memory-operated switches

Each memory operated switch (8, 9, 10 etc. Figure 1) comprises two separate valves, a pentode $V_{20}$ and a diode $V_{21}$ (Figure 2).

The pentode valve $V_{20}$ has its suppressor grid connected to the anode of valve $V_{18}$, its control grid to the anode of valve $V_{13}$ (Figure 3, link A) and its anode to the control grid of valve $V_1$ (through biassing battery 35) of the associated channel selector switch. Valve $V_{20}$ is initially cut off on its suppressor grid which is, as above stated, connected to the anode of valve $V_{18}$, and also on its control grid which is connected to the anode of valve $V_{13}$ (Figure 3).

The diode valve $V_{21}$ has its cathode connected through link D to the anode of $V_{12}$ of the associated position memory multivibrator and its anode, in common with all the other diode anodes of the memory-operated switches, to the control grid of valve $V_{19}$.

The arrangement is such that when the first particle in the first scanning line is encountered a pulse is transmitted through valves $V_{18}$ and $V_{19}$ to the first channel selector switch 4 (Figure 1) causing it to switch to its other (or "up") position. Subsequent pulses representing further particles in the first scanning line successively operate the subsequent channel selector switches 5, 6, 7 etc.

These pulses also appear on the suppressor grids of all the valves $V_{20}$ but as the latter are cut off on their control grids no signals appear at their outputs.

During the second scanning line the position memory 12 operates at the appropriate moment as above described and this causes the potential at the anode of diode $V_{21}$ to fall (since the diode conducts due to the lowering of its cathode potential) so that valve $V_{19}$ is cut off on its control grid. At the same time the potential of control grid of valve $V_{20}$ associated with the position memory 12 rises so as to allow this valve to conduct as soon as its suppressor grid rises in potential due to the receipt of the expected pulse (if the first particle in the first line is a large one overlapping more than one line).

When this pulse is received on the grid of $V_{18}$ its anode provides a positive pulse which "opens" valve $V_{20}$ which thereupon delivers a negative pulse from its anode to the control grid of valve $V_1$ of the associated channel switch 4. If no pulse is received before the end of the inspection period then the various electrodes of these valves return to their original potentials.

Due to the above described circuit arrangement it will be clear that, in effect, the main route switch is "opened" and the appropriate memory-operated switch "closed" whenever any one of the position memory units operates to commence an inspection period for the second (or repeated) appearance of a pulse which has set that memory unit in the previous scanning line.

It will be clear, therefore, that the first appearance of a particle has the effect of setting a memory unit into operative condition. If the particle is a small one then during the second scanning line when the memory unit operates and no pulse is received (which would re-set the memory unit) a large negative pulse is delivered by the particle completion unit to the associated sizing adder. If the particle is a big one then a smaller negative pulse is delivered by the particle completion unit in the second scan and the position memory is reset so that on the third scanning line a further pulse is delivered to the sizing adder. If the particle overlaps three lines of scan then this pulse will be of small amplitude but if it only overlaps two lines then the pulse will be a large one and will terminate the operation of the adder.

Thus the sizing adders will deliver a succession of pulses corresponding in amplitude to the number of scanning lines occupied by each particle. This succession of pulses can be analysed in any suitable manner, for example, in a counting means or "analyzing device" of known type to provide a count of the total number of particles scanned and individual counts of particles of different sizes. The analyzing device may comprise an oscilloscope on which the pulses are observed and counted, or may comprise a pulse-height analyzer device.

Sizing adder

The pulses delivered by each particle completion unit, as above stated, are delivered to an associated sizing adder (23, 24, 25, 26 etc. Figure 1) which preferably comprises a capacitor integrating unit, for example a diode pump, so arranged that the arrival of each pulse of the specified kind adds a definite charge to the capacitor. When a particle has been fully scanned the arrival of the pulse of greater amplitude (as referred to above) causes the discharge of the capacitor which is then ready for subsequent use.

Figure 4:
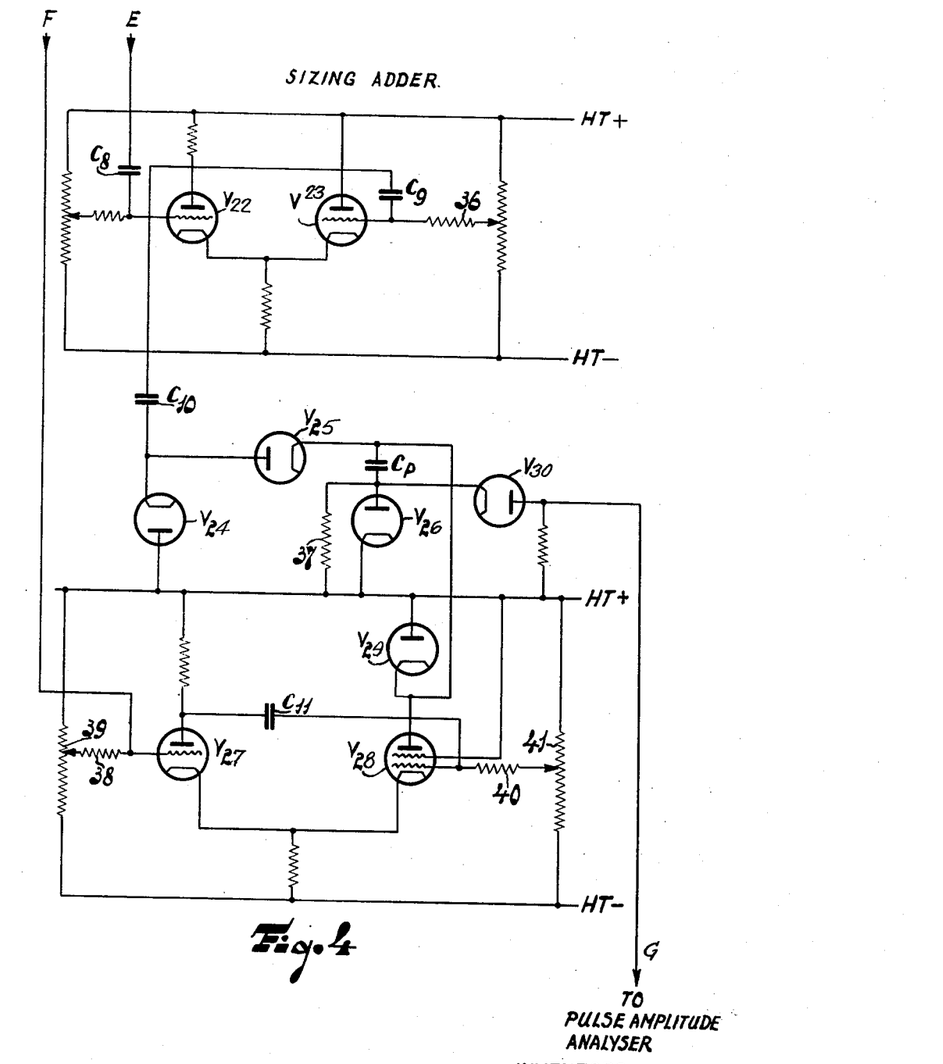

A suitable circuit for this purpose is shown in Figure 4 in which valves $V_{22}$ and $V_{23}$ form a cathode coupled bistable multi-vibrator. The negative-going pulses received through link E are applied through capacitor $C_8$ to the control grid of $V_{22}$ which is initially conducting. Valve $V_{23}$ is initially non-conducting and has its control grid connected to the anode of $V_{22}$ through capacitor $C_9$. Each of the control grids is connected to the slider of a potentiometer connected across the HT supply lines so that the standing potential on each grid can be pre-set.

When a negative-going pulse is received on the grid of valve $V_{22}$ the valve is cut-off and the valve $V_{23}$ conducts. The potential at the anode of valve $V_{22}$ rises to the HT line potential and remains at this value for a time determined by the time constant of $C_9$ and resistor 36. At the end of this period the multi-vibrator returns to its original condition. A positive-going pulse of controlled amplitude therefore appears at the anode of $V_{22}$ when the multi-vibrator is triggered. This pulse is fed through capacitor $C_{10}$ to the diode pump circuit constituted by the diodes $V_{24}$ and $V_{25}$ and capacitor CP, and is applied to the junction of the anode of $V_{25}$ with the cathode of $V_{24}$, the anode of which is connected to the HT+ line. The cathode of $V_{25}$ is connected to one pole of capacitor CP the other pole of which is connected to the anode of diode $V^{26}$ and to one pole of resistor 37, the cathode of $V_{26}$ and the other pole of the resistor being connected to the HT+ line.

The output of this diode pump circuit is taken from the junction of CP and the anode of diode $V_{26}$ and is delivered via diode $V_{30}$ to common lead G connected to the input of the analyzing device above mentioned.

Associated with the diode pump circuit is a monostable multi-vibrator or flip-flop comprising valves $V_{27}$ and $V_{28}$ which are cathode coupled. The valve $V_{27}$ has its anode connected to the HT+ line through a suitable load resistance and its control grid to the slider 38 of potentiometer 39 connected across the HT supply so that the potential of the grid can be pre-set.

The anode of valve $V_{27}$ is coupled through capacitor $C_{11}$ to the control grid of valve $V_{28}$ which is preferably a tetrode. The anode of $V_{28}$ is connected to the cathode of $V_{25}$ and to the cathode of diode $V_{29}$ the anode of which is connected to the HT+ line. The control grid of $V_{28}$ is suitably biassed by being connected to the slider of potentiometer 41, connected across the HT supply.

In the initial or starting condition the valve $V_{27}$ is conducting, the valve $V_{28}$ is cut-off and the capacitor CP carries no charge.

When a first (positive going) pulse is received (from the anode of valve $V_{22}$) representing the first appearance of a particle the capacitor CP receives a charge and the potential across it rises. No signal appears on lead G since the diode $V_{26}$ conducts, the diode $V_{29}$ does not conduct and since $V_{28}$ is cut off on its control grid the rise of potential at its anode is ineffective.

If the particle is a large one further pulses (representing successive scans) add to the potential across the capacitor CP.

When the scanning of the particle is complete a negative-going pulse of large amplitude is received on the grid of $V_{27}$ from the screen grid of valve $V_{16}$ in the respective particle completion unit (through link F). This trips the multi-vibrator circuit and valve $V_{28}$ conducts. This lowers the potential of the pole of capacitor CP connected to the cathode of $V_{25}$ until the diode $V_{29}$ conducts which limits any further drop in potential. A negative pulse thereupon appears at the cathode of $V_{30}$ which passes it to lead G. The amplitude of this pulse corresponds to the charge on the capacitor CP. Since this pulse at lead G appears in response to the pulse which is produced at lead F by the particle completion unit only after the complete scanning of each particle, each of the particle completion units (27, 28, 29 and 30) is a means interconnecting the associated position memory means and counting means to prevent double counting of a particle scanned twice by adjacent line scansions.

After this capacitor has been discharged via resistor 37 the multi-vibrator returns to its original condition the time delay being dictated by the time constant of capacitor $C_{11}$ and resistor 40 and the whole adder is ready for its next cycle of operation.

It will be clear that the circuits above described may be modified and additions may be made thereto without going outside the scope of the invention, for example pulse shaping and/or limiting devices of known kind may be employed where necessary. A particular example occurs in the particle completion unit where it is necessary to distinguish between the waveforms $5(f)$ and $5(e)$. In this instance it may be desirable to include a biassed diode to ensure operation of the sizing adder only by a negative pulse of the correct amplitude. The various biassing batteries shown may be replaced by appropriate circuitry for example by providing a negative HT potential in the known manner. Other changes or variations may be made to suit particular circumstances as they arise in practice.

What we claim is:

1. Particle counting apparatus comprising means for scanning along successive lines a sample of the particles to be counted, large particles overlapping successive lines, pick-up means co-operating with the scanning means for producing an electrical signal which is a measure of the presence and distribution of the particles, means for avoiding multiple counting of a large particle scanned more than once, said last-named means comprising position memory means connected to receive said signal and remember for the duration of a line scansion the position on a line of the occurrence of said signal, counting means responsive to the derived signal or signals for giving an indication of the total number of particles scanned, and means interconnecting said position memory means and said counting means to prevent double counting of a particle scanned twice by adjacent line scansions.

2. Particle counting apparatus comprising means including a cathode ray tube for the rectilinear scanning along successive lines of a sample of the particles to be counted by a flying spot, large particles overlapping successive lines, means including a photo-cell co-operating with the scanning means for producing electrical signals which are a measure of the presence and distribution of the particles, position memory means connected to receive said signals and remember the position of each particle from one line of scan to the next, counting means responsive to the derived signal for giving an indication of the total number of particles scanned, and means interconnecting said position memory means and said counting means to prevent double counting of a particle scanned twice by adjacent line scansions.

3. Particle counting apparatus as claimed in claim 2 comprising a sizing adder means associated with each position memory means for registering the number of times a particle is remembered and producing an electrical signal corresponding thereto.

4. Particle counting apparatus comprising a cathode ray flying spot scanning means, a pick-up unit including a photo-electric cell, a particle sample positioned in operative relation with said scanning means and said photo-electric cell so that electrical signals are produced by said cell when the sample is scanned by said scanning means, a plurality of channels for said signals each comprising electronic channel selector switch means, position memory means, sizing adder means and electronic switch means operated by said position memory means for passing each signal generated by said pick-up means into the appropriate channels.

5. Particle counting apparatus as claimed in claim 3 wherein the position memory means comprises a capacitor to one pole of which an alternating potential of suitable waveform is applied, a clamp means connected to maintain the other pole of the capacitor at a substantially fixed potential until the arrival at the clamp of a signal derived from a pulse representing the scanning of a particle whenever the clamp opens to permit the capacitor to retain a charge corresponding to the potential applied to it at the instant the signal is received.

6. Particle counting apparatus as claimed in claim 5 wherein each sizing adder means comprises a diode pump circuit including a capacitor the charge on which is increased in a step by step manner coincident with the receipt of signals representing the successive scanning of a large particle overlapping two or more scanning lines.

7. Particle counting apparatus as claimed in claim 6, wherein each channel comprises a particle completion unit adapted to be controlled by the associated position memory unit and to be responsive to the receipt of a pulse or pulses passed into the channel and to deliver to the associated sizing adder means a pulse of predetermined amplitude when a particle has been totally counted and a pulse of different amplitude when the count is incomplete.

8. Particle counting apparatus as claimed in claim 7 wherein the pulse of predetermined amplitude delivered by the particle completion unit is utilised to bring about the discharge of the capacitor of the diode pump circuit so that the sizing adder delivers a pulse the amplitude of which corresponds to the number of charges which it has received.

9. Particle counting apparatus as claimed in claim 8 including pulse amplitude analysing means energised by the output of the sizing adder and giving an indication of the total count of the particles and a plurality of individual total counts each representing a particlar size of particle.

References Cited in the file of this patent

UNITED STATES PATENTS

| | | |
|---|---|---|
| 2,472,542 | Moerman | June 7, 1949 |
| 2,480,312 | Wolf | Aug. 30, 1949 |
| 2,494,441 | Hillier | Jan. 10, 1950 |
| 2,528,394 | Sharpless et al. | Oct. 31, 1950 |
| 2,584,052 | Sandorff et al. | Jan. 29, 1952 |
| 2,731,202 | Pike | Jan. 17, 1956 |